MAGNETIC DATA-STORAGE DEVICE AND MATRIX

Filed March 3, 1959 3 Sheets-Sheet 1

INVENTOR:
Donal A. Meier
By Louis A. Kline
John J. Matlago
His Attorneys

INVENTOR:
Donal A. Meier
By Louis A. Kline
John J. Matlago
His Attorneys

May 26, 1964 D. A. MEIER 3,134,965

MAGNETIC DATA-STORAGE DEVICE AND MATRIX

Filed March 3, 1959 3 Sheets-Sheet 3

INVENTOR:
Donal A. Meier
By Louis A. Kline
John J. Matlago
His Attorneys 3,134,965
Patented May 26, 1964

3,134,965

MAGNETIC DATA-STORAGE DEVICE AND MATRIX

Donal A. Meier, Inglewood, Calif., assignor to The National Cash Register Company, Dayton, Ohio, a corporation of Maryland Filed Mar. 3, 1959, Ser. No. 796,892
12 Claims. (Cl. 340—174)

This invention relates to data-storage means for storage of information or data presented in binary form, and more specifically to magnetic data-storage means.

In the digital data-processing and control arts, it is known that data or information represented in binary form as binary digits or "bits," may be stored in respective bistable magnetic elements, the bits each being commonly represented by the symbol "1" and absence of a bit being represented by "0." Also, a bit may be represented by a selected one of the two possible remanent states of the corresponding magnetic element and absence of a bit by the opposite remanent state. According to this mode of data-representation, a bit is stored or "written" into a storage element, by coercing or "driving" the element to the selected or first remanent state, which may likewise be symbolically represented by "1," and absence of a bit ("0") may be stored by driving the element to the opposite or second remanent state (or by leaving the element in that remanent state if it already so exists), the second remanent state similarly being symbolically representable by "0." Extraction or "reading" out a binary bit from an element in which it is stored is effected by applying a coercive effort which will drive the element from "1" to "0," this change in remanent state of the element causing generation by induction of an E.M.F. or potential in a "sense" conductor which is disposed in inductive relation to the magnetic element. The coercive effort necessary to drive the magnetic element from either remanent state to the other is of substantially the same magnitude in either case, and is in the prior art commonly produced by contemporaneous passage of respective currents through each of at least two conductors both of which are disposed in inductive relationship with the element. In the known system of selecting a storage-unit for reading, use is thus made of two separate currents, usually as pulses of brief duration, so that there may be a selection for driving of any one of an array of magnetic elements. This requirement for a plurality of storage elements (usually a quite large number thereof) is imposed by the necessity for storage of many bits of information or data. Arrangements of the elements in arrays, usually of two-dimensional character, permits orderly and economical constructions and facilitates operations, as well as permitting relatively simple selection of a single one of the elements of an array for operations. According to that scheme, the elements, and their respective electric conductors or "coils" may be disposed in rows and columns in a two-dimensional array, and respective drive-current windings connected to form row-drive windings in series in the respective row, and column drive windings in series in the respective column. Also in conformity with the scheme, each of the two contemporaneous drive currents or pulses is, by itself, of insufficient strength or magnitude to coerce or "reverse" the element to the opposite state but are together sufficient to produce enough coercive effort to drive the core or element quickly to the opposite remanent state. These and other features of previously known magnetic binary storage devices, including the techniques of composing a plurality of two-dimensional arrays of the elements into a three-dimensional matrix of storage elements and windings are well known in the mentioned arts, and more complete elucidation thereof may be gained from such publications as U.S. Patents 2,691,155; 2,709,248; and 2,734,183 and the publications cited in those patents.

The invention herein disclosed in conjunction with the accompanying drawings comprises a novel magnetic data-storage device and a novel data-storage matrix device comprising a plurality of the data-storage elements, and a novel procedure for selecting and "reading" information or data stored in one or more of the elements, all of the novel means and procedure contributing to exceptionally small and inexpensive data-storage arrays and matrix devices, and to exceptionally fast data-storage and read-out operations.

According to the invention, the individual data-storage elements each comprise a small length of a thin film or layer of bistable magnetic material which is supported within and in close relationship with respect to an encircling coil or solenoid of very small dimensions and of one or more turns of electric conductor, the two components thus forming a bistable magnetic storage device of very small size and of rod-like external configuration wherein the magnetic layer provides a part only of the magnetic flux path of the solenoid. When used in a three-dimensional data-storage matrix device, a plurality of the combinations of bistable magnetic thin layer and encircling coil or solenoid are conveniently provided each in the form of a novel relatively long unitary rod-like structure or device in which a plurality of spaced-apart solenoids are all in axial alignment, each encircling its thin layer bistable magnetic element; and in this novel unitary rod-like structure the series of solenoids are preferably but not necessarily formed integrally from the same electric conductor (single or multiple wire). Also, in such unitary structure the magnetic elements, which conveniently are formed of cylindrical configuration, may simply be respective small portions of a single, long, cylindrical and thin layer of bistable magnetic material, those intermediate portions of the thin layer disposed between next-adjacent solenoids being, in effect, unused. In this latter construction of a unitary multi-element solenoid-and-element structure, the thin film or layer or plurality of axially-spaced but axially aligned separate magnetic thin layers or films may be, and preferably are, supported by and upon the exterior of a relatively rigid rod-like support structure or means upon which the layer or film is formed; and the support structure may be principally or entirely of a stiff shape-retentive fine rod of non-magnetic material such as glass. Thus a multiple-element structure of generally rod-like configuration, comprising a relative long fine-gauge filament of glass or the like non-magnetic non-conductor, and a cylindrical thin layer of magnetic material thereon and encircled by a plurality of integrally connected but spaced-apart solenoids, forms a unitary device which may readily be inserted through each of spatially-related axially aligned solenoid sets, each comprised in a respective one of a plurality of juxtaposed two-dimensional arrays of such solenoid sets, and which unitary structure or device may equally readily be removed therefrom. Further, the unitary device thus may form the basis of a novel three-dimensional magnetic data-storage matrix device and an improved mode of "linear" read-out of information or data from such a storage matrix device. According to this feature of the invention, a rod-like structure of the characteristics just mentioned may be made to include as many serially-connected solenoids as the number of bits in a computer "word," and the data-storage matrix device will comprise an equal number of two-dimensional arrays of similarly-disposed solenoid sets, each array comprising a specific solenoid set disposed for cooperation with a respective solenoid-and-element structure of the unitary rod-like device. Using the novel rod-like devices briefly described hereinabove, the storage and extraction from storage of data bits may be accomplished in exceptionally brief intervals of time; the "turn-over" or "switching" time of the magnetic elements being of the order of fifty milli-microseconds when coincident current (two-current) coercion of elements is employed and even faster when single-current coercion of the elements is employed. Since all of the bits of a multi-bit word stored in a storage matrix can, by the novel process and means of the invention, be "read out" or extracted contemporaneously in a very brief interval by a single drive current through a single rod-like device and irrespective of the number of bits per word, it is noted that impressive improvements in data processing speeds are made possible.

It is, therefore, an object of this invention to provide a novel data-storage device of the character hereinbefore briefly described.

Another object of the invention is to provide an improved data-storage device.

Another object of the invention is to provide an improved mode of operating a magnetic data-storage device.

Another object of the invention is to provide means for more rapidly accessing data stored in magnetic data-storage elements.

An additional object of the invention is to provide an improved data-storage matrix device comprising a plurality of improved data-storage devices.

Another object of the invention is to provide a less expansive and readily replaceable magnetic data-storage device.

Another object of the invention is to provide a magnetic data-storage device which requires less physical space than previously known comparable magnetic data-storage devices.

Another object of the invention is to provide a magnetic data-storage device permitting faster data storage and read-out operations.

Another object of the invention is to provide a simple unitary magnetic data-storage device capable of storing many binary data bits in a very small space.

Other objects and advantages of the invention will become apparent or be made evident in the claims and in the following description of a preferred mode and organization of apparatus according to the invention, the description containing references to the appended drawings forming part of this specification, and in which drawings:

FIG. 1 is a greatly enlarged view, with relative dimensions distorted in the interest of clearness of illustration, of an exemplary single magnetic data-storage structure according to the invention;

FIG. 1*a* is a still further enlarged view of one type of solenoid used with the magnetic means depicted in FIG. 1;

FIG. 1*b* is a view similar to FIG. 1*a*, depicting a solenoid of slightly modified construction, for use with the magnetic element or means depicted in FIG. 1;

Figures 1, 1A, 1B, 2:
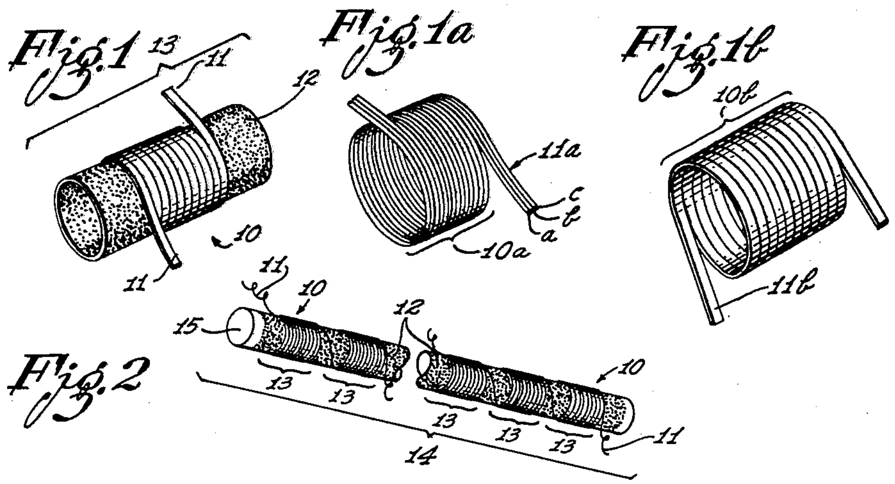
FIG. 2 is a considerably enlarged view of a plural-unit magnetic data-storage device according to the invention, with a middle portion removed.

In view of the fact that individual magnetic storage elements or devices according to the invention are of very small dimensions and measurable in some dimensions in terms of angstrom units (A.) and mils (thousandths of an inch), it should be noted that for intelligible illustration in the drawings the several elements and structures are necessarily depicted in grossly enlarged form and with relative dimensions somewhat out of proportion. The enlargement and distortion is for the sake of clarity of illustration and to facilitate explanation of the invention.

One of the basic concepts of the invention resides in utilization of a combination of a solenoid means including at least one solenoid of very small diameter, and a thin layer or film of bistable magnetic material disposed within the solenoid and inductively related to or linked with all of the one or more solenoids of the solenoid means. The thin layer or film of magnetic material may most conveniently be formed of thin-walled cylindrical form as hereinafter explained, and is of such thinness and of such material as to provide a magnetic element having sufficiently low coercivity and a sufficiently square magnetization-induction characteristic (loosely termed the hysteresis loop) to effectively serve as a magnetic data-storage element. The solenoid or solenoids which encircle the magnetic thin-film element serve to conduct currents for reversing the remanent flux state of the film, and as inductive means for producing an output potential incident to reversal of state of the flux in the magnetic film. An extension of the basic concept includes the incorporation, into a single unitary device, of a plurality of spaced-apart but axially aligned individual solenoids all electrically in series relationship and each encircling a respective portion of thin magnetic film of the above noted character. In each of the noted types of construction the solenoids are dimensionally very small and the active portion of the magnetic thin film inductively linked to a particular solenoid forms only a part of the flux path of the magnetic field of the solenoid. Further, it is noted that it is not necessary that the magnetic film have any particular magnetic orientation or "easy direction of magnetization" and that if an easy direction of magnetization is provided it should be in the axial or longitudinal direction rather than skewed or inclined with respect to the central axis of the film. These features and characteristics of the magnetic films and associated solenoid means, and materials and procedures, will be treated in more detail in connection with subsequent descriptions of specific exemplary physical structures according to the invention.

As a practical matter in production of the thin magnetic film or layer and in producing magnetic data-storage devices utilizing the film-and-solenoid combination in unitary form, the magnetic material may be deposited upon, and supported by, a suitable non-magnetic rod-like structure sufficiently fine in gauge to repose inside the solenoid or set of solenoids. As an example, such a rod-like support structure may comprise essentially a fine-gauge stiff filament or rod of glass or the like and of diameter of the order of ten or fifteen mils. Deposition of the magnetic thin film may conveniently be performed by electroplating procedures, for example, a specific example of which is hereinafter more fully described and explained; and when so formed the supporting structure will include a thin conductive layer of metal on the rod or filament and overlaid by the magnetic material. Conveniently also the rod-like support structure, with its adherent thin film of magnetic material, may of itself provide the physical device upon which one or more serially formed or connected solenoids are wound, thus dispensing with winding mandrel means and at the same time providing a more firmly constructed unitary device.

Referring now to FIG. 1, an exemplary basic data-storage device is shown to comprise a solenoid 10 formed of a plurality of close-wound turns of an insulated electric conductor 11, and a shell-like thin film 12 of bistable magnetic material. The unitary combination provides the essential elements of a basic data-storage device denoted generally by numeral 13. The solenoid may vary as to number of turns of conductor 11, according to end-results required in various usages of the device, an exemplary number of turns being ten as depicted. Preferably the solenoid is formed from a conductor of flat cross-section and is close-wound, to provide the most efficient solenoid with minimum practicable outside diameter; and accordingly a multiple-wire conductor such as that indicated at 11*a* in FIG. 1*a*, or a single flattened wire such as that at 11*b* in FIG. 1*b*, may be used. The multiple-wire conductor 11*a* comprises a plurality of individual fine wires, *a*, *b*, and *c*, insulated as a group and disposed in side-by-side relationship. In either case, the conductor is preferably flat-wound as indicated in FIG. 1, and may form ten-turn solenoids of outside diameter of the order of less than twenty mils and lengths of the order of one-sixteenth of an inch; it being understood that these dimensions are exemplary and may be varied within ranges fixed by the electromagnetic characteristics of the magnetic thin film with which the solenoid is to cooperate. The thickness and other dimensional and physical characteristics of the thin film may be varied within those ranges providing the proper coercivity and requisite squareness of B–H loop for magnetic data-storage operations; and specific examples in respect of these characteristics are hereinafter set out in some detail in connection with an explanation of an exemplary mode and procedure for producing the thin film.

Referring now to FIG. 2, there is depicted an exemplary unitary data-storage device according to the aforementioned extension of the basic concept of the invention. Therein is shown a long slender rod-like support structure 15 of glass and which may be a monofil or of multi-filament composition; a middle portion of which glass "base" or support has been broken away to facilitate illustration. It is to be understood that the depicted structure, while normally of very small diametral dimension, may be relatively quite long. For example, a glass monofil support structure may be of uniform diameter in the range from five to thirty mils, and many inches long, the length being dictated principally by the number and dimensions of the solenoids 10 to be accommodated thereon. Disposed over at least the operationally significant portions of the cylindrical surface of rod-like structure 15 is a thin film 12 of bistable magnetic material of the aforementioned characteristics. It is to be noted that conveniently and as shown the film 12 may substantially cover all that portion of the support rod which is to receive a series of solenoids, but that successful operational results may be obtained with spaced-apart films, one within each respective solenoid and cooperable therewith. A plurality of solenoids 10 is wound over the rod-like support structure 15 and the thin film or films 12; and this series of solenoids is either formed from a single integral electrical conductor so the solenoids are electrically in series relationship, or the solenoids are subsequently so connected. As depicted, the solenoids 10 are spaced-apart along support structure 15 whereby to form or provide a plurality of individual spaced-apart data-storage devices 13 all structurally united into a unitary rod-like device 14. The spacing of the devices 13 is governed by structural dimensions of means presently to be described and explained. Due to the small dimensions of the device 14 it has rod-like characteristics and appearance and may accurately be so characterized. If desired, a suitable protective medium, such as one of the commercially available "plastic" sprays, may be applied to film 12, either prior to the winding of solenoids 10 or thereafter, or both, whereby to protect the film from oxidation or other chemical deterioration and to furnish a degree of protection against damage by abrasion. Neither the protective cover of plastic nor the thin layer of conductive metal underlying magnetic film 12 is illustrated in the drawing, due to the facts that both are transparent and that neither is deemed to be absolutely essential.

It is evident that in the devices hereinbefore described, the thin magnetic film 12, while depicted of cylindrical form, it is not necessarily required to be continuous in the direction of a circumference of the support structure 15. That is, the film might have longitudinally extending discontinuities or irregularities, without detriment to its operation characteristics. An exemplary and operationally acceptable magnetic thin film may be deposited upon an exemplary support from an electroplating bath, in accord with the following illustrative procedure and using the exemplary materials, current, apparatus, etc., detailed in the next succeeding paragraphs. Such a thin layer or film may be of an apparent average thickness of from 500 A. to 5000 A. as measured by indirect methods, but must not exceed an average thickness which provides adequate squareness of the B–H loop.

A glass monofil or rod of diameter .015"±.0002" is carefully cleaned and subjected to simultaneously applied sprays of silver salts solution and a reducing solution to provide a thin electrically conductive layer of chemically reduced silver uniformly distributed over the surface of at least a portion of the rod. The materials used for silvering the rod, and the mode, are conventional and per se well known. The materials are commercially available, for example, as Peacock Silver Solution and Silver Reducing Solution, marketed by Peacock Laboratories, Philadelphia 34, Pennsylvania. Uniformity of the silver layer may be improved by rotating and translating the rod through the sprays, and by building up the layer by making a plurality of passes of the rod through the spray and following each pass by a distilled water rinse. Layer thicknesses providing electrical resistances of from 0.4 ohm per inch to 1.5 ohms per inch of layer length, for example, give a sufficiently conductive substrate to permit satisfactory deposition of magnetic thin films having acceptable magnetic characteristics.

The exemplary glass monofil with the adherent layer of silver is subjected to electroplating, preferably while positioned within a helical anode of, for example, one inch diameter and one inch length. Current density is preferably not higher than about thirty amperes per square foot of exposed rod, and an exemplary plating period is of the order of about thirty-five to thirty-seven seconds in a bath having the following composition and characteristics:

| | |
|---|---|
| Ferrous chloride ($FeCl_2.4H_2O$) | 315 g/l. |
| Nickel chloride ($NiCl_2.6H_2O$) | 10 g/l. |
| Calcium chloride ($CaCl_2$) | 180 g/l. |
| Water to make solution. | |
| pH | 0.9 to 1.0. |
| Temperature | 75° C. |
| Anode | Nickel. |

The plating apparatus is preferably arranged so the rod is exposed to the bath only while directly within the anode coil, the rod being slowly moved through a seal at one end of the anode and out of the bath at the other end to accomplish this preferred type of exemplary procedure.

An exemplary rod-like structure formed according to the exemplary film-producing mode just described and explained, includes a magnetic thin-film having a composition of about 97% iron and 3% nickel by weight as determined by chemical analysis; and the film has excellent magnetic characteristics (low coercivity and very square "hysteresis" loop) and a thickness calculated by indirect procedures to be of the order of from 2000 A. to 3000 A. (angstrom units). Since the film thickness is not susceptible of easy nor direct nor accurate measurement, but must be determined by analytical procedures or other indirect modes of calculation, it is preferable to define the film thickness in terms of coercivity and squareness of B–H loop. For rapid change of magnetic state from one state to the opposite state the coercivity is desirably high and for data-storage functions the B–H loop should be quite square, especially in those applications wherein "coincident-current" selection is utilized. It may be noted that, in general, as the thickness of the magnetic film is increased above an optimum value the squareness of the magnetization loop, $B_s/B_r$, decreases markedly; and that below an optimum thickness of film the coercivity increases. Accordingly, the best average thickness of magnetic layer or film is dependent upon the end use to which the rod-like devices are to be put and upon the characteristics of the electronic apparatuses with which they are to be employed. Information relative to technical terms used herein in connection with magnetic materials, and appurtenant other basic information concerning magnetic phenomena may be derived from texts devoted to the subject of ferromagnetism. For example, the text "Ferromagnetism," by Bozorth, published by D. Van Nostrand Company, is cited.

From the preceding description it is apparent that magnetic data-storage device such as that depicted in part in FIG. 2, may be of very small dimensions. For example, using ten turns of conductor comprised of a rounded-edge flat wire 11*b* of one and one-half mils by six mils cross-section, or ten turns of a conductor 11*a* comprised of three #44 wires for each solenoid 10, and a glass rod of ten mils diameter, an exemplary device 14 may have a maximum diameter such as to easily pass through a twenty-mil bore. The exemplary device 14 as described and illustrated in FIG. 2 and comprising glass rod 15 with the magnetic thin film 12 and series of integral of interconnected solenoids 10 tightly wound thereon and secured thereto by a very thin layer of protective adhesive film (not shown), is adapted to easy and rapid automatic manufacture, and is admirably adapted for use and operation with data-storage matrices adapted for storage of binary words of from one to hundred of binary bits each. These features will be hereinafter made more fully evident in connection with the continuing description of the invention.

Figure 3:
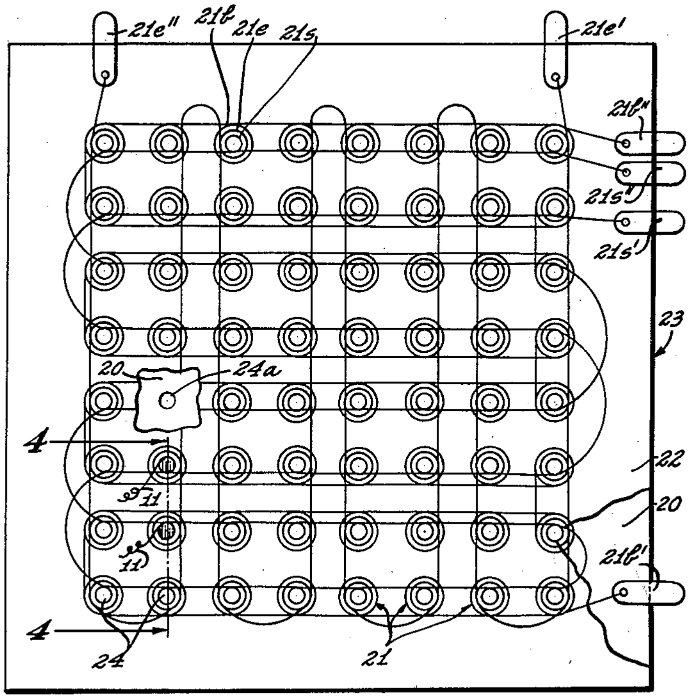
FIG. 3 is a greatly enlarged plan view of a device comprising a unitary embedment of a two-dimensional array of solenoid sets and other winding means, according to the invention, with portions removed to illustrate features of construction.
Figure 4:
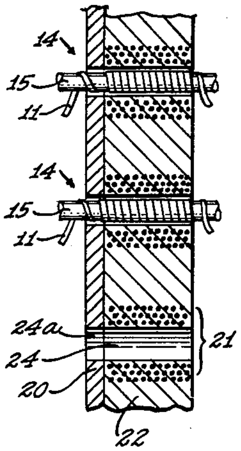
FIG. 4 is a further enlarged sectional view taken along line 4—4 in FIG. 3.

In FIGS. 3 and 4 there is depicted a structure containing a two-dimensional array of plural-coil units, each of which units includes a set of solenoids which set is adapted for cooperation with a respective single device of the nature of that depicted in FIG. 1, whereby a novel mode of data-storage unit selection and read-out is made possible. While a single one of such solenoid array structures may be used in connection with a plurality of the devices of FIG. 1 (one device per solenoid set of FIG. 3), it will hereinafter be made evident that advantages of a higher order are attained when plural-element devices according to FIG. 2 are employed with a plurality of juxtaposed two-dimensional winding arrays of the type depicted in FIG. 3. In FIG. 3, a thin flat sheet-like base 20 of non-magnetic (and preferably non-conductive) material such has impregnated fiberglass fabric serves as a support upon which an array of interconnected solenoid sets may be formed. In some respects the invention herein disclosed is an improvement and an extension upon that disclosed in applicant's copending application, Serial No. 728,739, filed April 15, 1958, and now abandoned; and the winding array including the solenoid sets may be constructed according to modes and by means generally described in that application. Alternatively the solenoid sets may be made according to or by any other suitable mode and means, such as the mode and means disclosed in copending application, Serial No. 20,494, filed April 6, 1960. As depicted in exemplary form in FIG. 3, and in section in FIG. 4, the solenoid sets, such as are indicated by numeral 21, each comprise a plurality of individual ten-turn solenoids, and in this case three such solenoids, 21*s*, 21*b*, and 21*e*, wound substantially concentrically. Each solenoid group or set is so mounted that its bore is in alignment with a respective aperture 24*a* provided in base 20, whereby a magnetic film-and-solenoid device such as is indicated collectively by numeral 13 in FIG. 1 may be inserted into or passed through the aperture and positioned in the bore. The concentric-solenoid sets are in the exemplary structure arranged in what is herein termed a two-dimensional array, eight solenoid sets wide and eigtht sets high with the sets arranged in rows and columns as is evident. In the exemplary structure depicted, the innermost solenoids or coils, 21*s*, of all of the 64 sets of the array, are electrically connected in series (being preferably all formed of the same integral conductor), but preferably are wound so half of them are clockwise-wound and the other half counterclockwise-wound as indicated in FIG. 3. The next innermost solenoids of the solenoid sets, labeled 21*e*, are similarly all electrically connected or formed in series, and are shown all wound in the same direction. The outer solenoids, 21*b*, of the sets are wound in the same direction as are the respective solenoids 21*e*, and are likewise serially connected or formed. Collectively the solenoids 21*s* and their interconnecting conductor portions are termed the "sense" winding or lead of the array, the solenoids 21*e* and connections are termed the "enable" winding or lead, and the solenoids 21*b* and connections are termed the "bias" winding or lead of the array. The three named windings are in each case terminated at suitable conventional terminals, such as 21*s*′—21*s*″, 21*e*′—21*e*″, and 21*b*′—21*b*″, respectively, the terminals preferably being secured to base 20 in any suitable conventional manner, as by rivets or adhesive (not shown). Subsequent to formation of the solenoid sets of the array, the arrangement of solenoid sets and interconnections forming the windings may be embedded in a suitable preferably transparent embedding compound by known procedures, whereby the array is integrated into a flat one-piece plate-like embedment 22 having bores therethrough, each bore extending through a respective one of the solenoid sets and aligned with a respective one of the apertures in base 20, whereby each solenoid set may have placed therein a respective device 13. Exemplary solenoids, both those on rod 15 and those secured to base 20, are of the order of ten turns each, although to indicate possible variations in the number of turns, some of those depicted in the drawings have other than ten turns.

The foregoing description of an array of units defines an exemplary two-dimensional array of sixty-four sets of three solenoids each. This number, and the geometrical configuration are, however, exemplary only, and within the scope of the invention the number of sets may be increased or decreased, and any other desirable and suitable areal configuration may be selected and used. Further, the mode of interconnetcing the sense solenoids 21*s* to form a sense winding may be considerably varied, according to the end use to which the array is to be put; and the same is true of the other windings. Also, each solenoid set may include more or fewer than three solenoids, the latter number being exemplary and that which is preferred in connection with a particular exemplary operation with an exemplary three-dimensional matrix of solenoid arrays and magnetic devices, hereinafter explained and described in connection with FIGS. 5 and 6.

Figure 5:
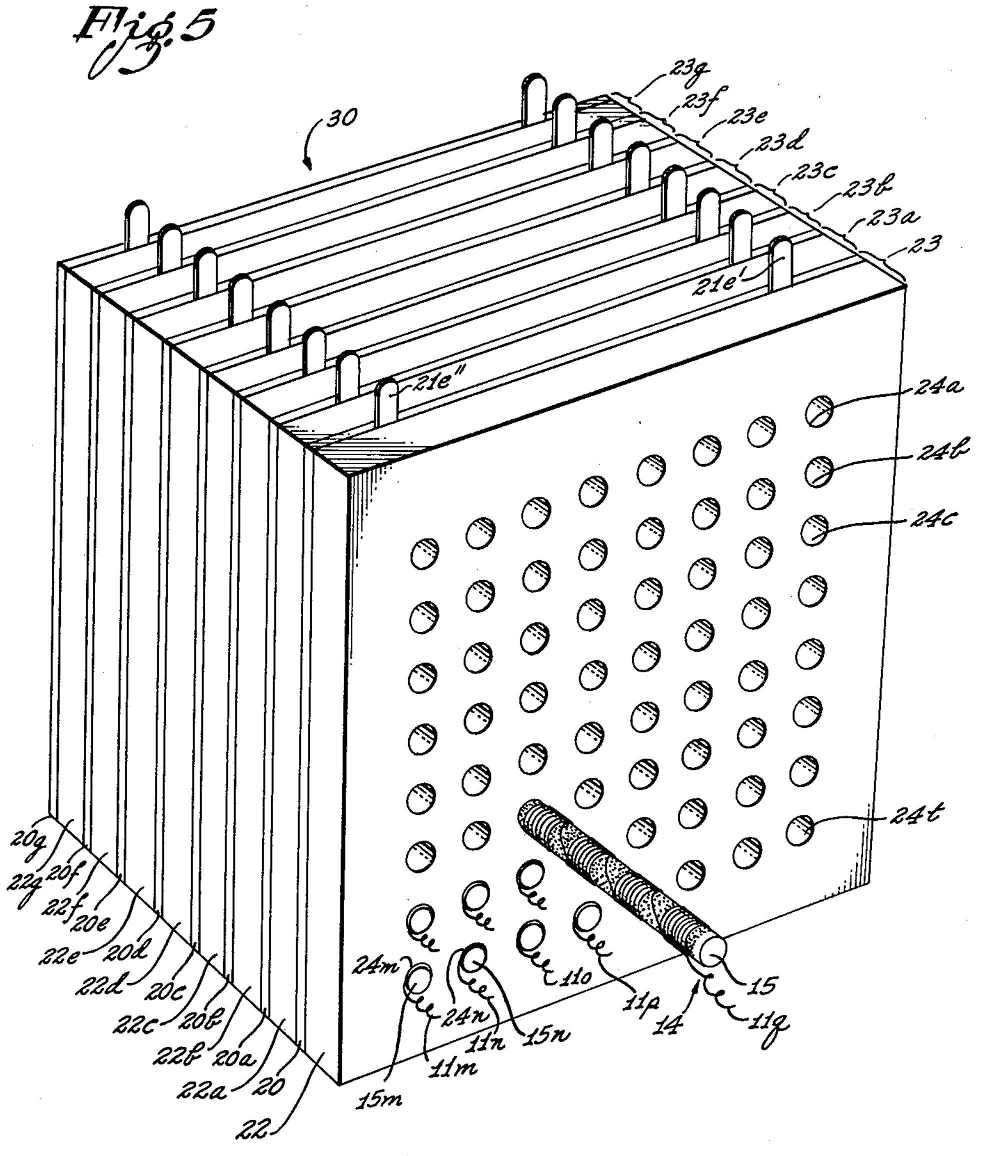
FIG. 5 is a grossly enlarged and somewhat distored view of a data-storage matrix according to the invention, with some parts removed for ease and clarity in illustration.

In FIG. 5 there is depicted an exemplary three-dimensional data-storage matrix device 30, utilizing magnetic device means according to the invention, with some of the rod-like magnetic-element and solenoid devices 14 partly or wholly removed in the interest of simplicity and clarity of illustration. The exemplary matrix device includes eight solenoid array embodiments or "storage planes" of the nature of that depicted in FIG. 3, and therein designated as an integral construction or "plate" by number 23, the eight array plates 23, 23*a*, 23*b*, etc., of the matrix device being disposed or juxtaposed in back-to-face relationship, with similarly areally disposed solenoid bores and base apertures of the several "plates" 23, 23*a*, 23*b*, etc., in axial alignment. The several plates of the exemplary matrix, after being carefully assembled and aligned to bring similarly positioned bores 24 into accurate axial alignment so as to provide sixty-four clear passages or through bores entirely through the assembly, may be secured together in any suitable manner. The plates may, by way of example only, have a thin cementitious material applied to abutting faces and backs while being positioned on guide wires or rods passing through several respective sets of the bores, and then clamped together until the cement has set. Thereafter the guide wires or rods are withdrawn. Thus there may be formed a three-dimensional matrix of embedded solenoid sets, in which matrix each solenoid set is a member of a respective row of solenoid sets, a member of a respective column of solenoid sets, and a member of a respective "stack" of axially aligned solenoid sets. As hereinbefore noted, it is within the concept of the invention to have as many as may be desired of winding arrays or "plates" in a matrix device; and as will presently be made more evident, the matrix device may preferably be made to comprise as many "plates" or winding arrays as there are bits in a storage "word." That is, if a computer "word" is composed of, for example, forty-four bits, the matrix device would include forty-four winding arrays or plates. To simplify illustration and description, the exemplary matrix device has but eight winding arrays or plates.

As indicated in FIGS. 4 and 5, each of the front-to-back or transverse bores, such as bores 24$a$, 24$b$, for example, extends all the way through the unitary matrix assembly, and each bore or passage is adapted to have inserted and receive therein a respective rod-like device 14 (FIG. 2) having eight properly spaced-apart element-and-solenoid devices 13 (FIG. 1), for cooperation with the respective eight solenoid sets. The solenoid sets of the several arrays may be wound with internal diameters of about twenty mils, for example, whereby a device 14 comprising a rod 15 of ten mils diameter and solenoids 10 of the order of about fifteen mils outside diameter will readily pass into any of bores 24, 24$a$, 24$b$, etc. The solenoids 10 are so dimensioned and so spaced-apart in a unitary rod-like device 14 that when the latter device is properly positioned in a respective matrix bore, each solenoid 10 thereof will be disposed within a respective solenoid set 21 of one of the arrays, and with the magnetic thin film 12 (or portion thereof) encircled by both this respective solenoid 10 and the corresponding solenoids 21$s$, 21$e$, and 21$b$ of the corresponding solenoid set, as indicated in the sectional view in FIG. 4, and as indicated also in FIG. 5. Also, the endmost portions of the conductor, 11, from which the coaxially disposed solenoids 10 of a device 14 are formed, will extend outside the respective ends of the matrix bore in which the rod-like device 14 is positioned (as indicated by 11$m$, 11$n$, etc., at bores 24$m$, 24$n$, etc., in FIG. 5), whereby appropriate electrical connections may thereto be made for a purpose hereinafter more fully made evident.

As indicated in FIG. 5, the terminals of the "enable" windings of the several arrays or plates extend outwardly from the unitary "block" or matrix structure; and the same is true of the other groups of terminals (hidden in FIG. 5), whereby appropriate electrical connections may be made between the several windings and other operating circuits of a data-processing apparatus. The latter may be of any suitable and known type and are not per se of the present invention. Also, suitable connections may be made to the respective ends of the individual conductors from each of which a series of solenoids 10 is formed, whereby an electric-current drive pulse may be dispatched in either direction through any selected one of the conductors 11$m$, 11$n$, 11$o$, etc.

As indicated in FIGS. 3 and 4, it will be evident that one device, such as device 14, is required for each one of the sets of solenoids of a given array, and that any one of the basic data-storage devices 13 will be disposed within its respective set of solenoids 21 and that both the rod-supported solenoid 10, and the encircling set of solenoids 21 will encircle and be in close inductive relationship with the encircled thin-film magnetic element 12. Also, it is evident that the magnetic element furnishes a discontinuous magnetic circuit or path for its respective solenoids, which is in marked contrast with the conventional magnetic "toroid" or ring previously widely used in static magnetic data-storage devices. This marked difference is here noted and emphasized since that difference in the magnetic circuit permits a much less expensive winding for the magnetic elements and presents even more marked differences in simplicity of structure, ease of maintenance and replacement, and cost reduction, when used in a three-dimensional storage matrix device such as that depicted in FIG. 5. Unlike the situation involved in replacement of a toroidal or ring type core in the known static data-storage matrix devices, wherein the core is in the first place quite expensive and usually quite delicate and easily damaged and wherein replacement if at all possible is a tedious job of major proportions, in the case of the device of FIG. 5 the rod-like device 14, which is susceptible of cheap and easy manufacture, i.e. easily replaceable. Further, as will be hereinafter explained, quite important and novel electrical improvements are made possible in the selection and reading of individual single-bit data-storage devices in single arrays, and even more important improvements presented in selection and reading out of plural-bit computer "words" in parallel reading operations.

As hereinbefore indicated, the magnetic circuit or path of the magnetic field of a solenoid 10 and of which path the magnetic element 12 forms a part, is not completed within the confines of the element as in the case of a toroidal core, but is disposed in a direction lengthwise of the cylindrical film or its axis, and returns from one end of an encircling solenoid to the other end through the air or embedding material. Hence in the exemplary device there is in the magnetic circuit a non-magnetic gap of a length at least equal to the length of the solenoid 10 which encircles the magnetic part of the magnetic circuit.

Two exemplary modes of operation of the device depicted in FIG. 5 will be briefly described in connection with typical waveform diagrams depicted in FIG. 6. In the first and preferred mode, a steady bias is applied to every bistable storage device 13 in the matrix device. This is accomplished by coursing continuous bias current of approximately magnitude $+I/3$ through each of bias solenoids 21$b$. The bias current is supplied through the sets of terminals 21$b'$, 21$b''$ of the respective arrays and is provided by power-supply means (not shown) of suitable known type not per se of the present invention. This bias current is represented by waveform ($b$) of FIG. 6 and will be considered to pass from terminal 21$b'$ through solenoids 21$b$ to terminal 21$b''$ in each array. The currents used in operations of the matrix device are evaluated as to magnitude in terms of their respective coercive effects upon magnetic elements in the solenoid sets, it being understood that a current represented by the notation $I/2$ would in coursing through a solenoid be only half strong enough to change the state of a magnetic element from "1" to "0" or vice versa, and a current represented by the notation I would, in coursing through a solenoid, be of sufficient effect to reverse the remanent state of the magnetic element. Thus it is noted that the bias current passing through the bias solenoids does not by itself change the state of any storage element.

When it is desired to insert or "write" a bit ("1") into a particular specified storage element, a current represented by $-2I/3$ and designated "enable" pulse is caused to course through all of solenoids 21$e$ of the array in which that element is located. The enable pulse is opposite to the bias current in coercivity effect, and is indicated as being provided during the "write" time period $T_1$–$T_2$, and is represented by waveform ($e$). Contemporaneously (during interval $T_1$–$T_2$), a current represented by $-2I/3$ is passed through the solenoids 10 of that single rod-like device 14 which includes the specified storage element. The latter current, termed the "drive" current is represented by the negative-going portions of waveform (*d*) in FIG. 6; and is applied in such direction as to aid the enable current of waveform (*e*) and, with the latter, overcomes the oppositely directed coercive effect of the bias current. In this way the selected storage element is coerced or driven to "1," which is what is meant by writing a binary bit into an element. In the described manner any one or more data-storage elements comprised in a particular rod-like device may contemporaneously be selected and changed in state, each element being changed by concurrent action of an "enable" pulse through the enable solenoids of the respective array to which the element corresponds, and the single drive current pulse through the solenoids of the device 14. In other words, the individual elements 13 of a device 14 may correspond to respective bit positions of a computer word, and all of the bits of the word may thus be written "in parallel" (contemporaneously), it being noted that there are as many solenoid arrays as there are bits in a computer word.

Following a writing operation as previously described, a "read-out" operation may be performed in which the magnetic states of all those elements 13 of a device 14 in which "1's" are stored are again reversed and caused to induce in the respective sense solenoids respective potential pulses which constitute the extracted data bits previously stored in the elements. The read-out operation differs from the writing operation in that the enable pulse is not needed for read-out. As indicated in waveforms (*d*), (*b*), and (*e*), a drive pulse of $+2I/3$ effect through the solenoids 10 of a selected device 14 will additively combine with the steady $+I/3$ effect of the bias current to provide the necessary 1I effect required to drive the "1" storing elements of the device to "0" state. The "read" drive pulse, indicated as occurring in the time-interval $T_3$–$T_4$, is indicated by the positive-going pulses in waveform (*d*).

In the event a "0" is to be written into an element, the previously described writing operation is followed with the difference that the "enable" solenoids of the array comprising that element are not pulsed. That is, there is no enable pulse supplied, whereby the $-2I/3$ effect supplied by the drive winding 10 combines algebraically with the $+I/3$ effect of the bias winding 21*b*, leaving a $-I/3$ net effect which is insufficient to change the particular element from "0" to "1." This is graphically represented in waveform (*d*), (*b*), and (*e*) during interval $T_5$–$T_6$. During read-out of an element containing a binary 0 represented as occuring during interval $T_7$–$T_8$, the $+2I/3$ drive and the $+I/3$ bias again combine additively, but produce no effect upon the "0" storing elements since the net driving effect is toward the "0" state. Hence no output pulse is generated in the sense winding linking a "0" storing element.

Figure 6:
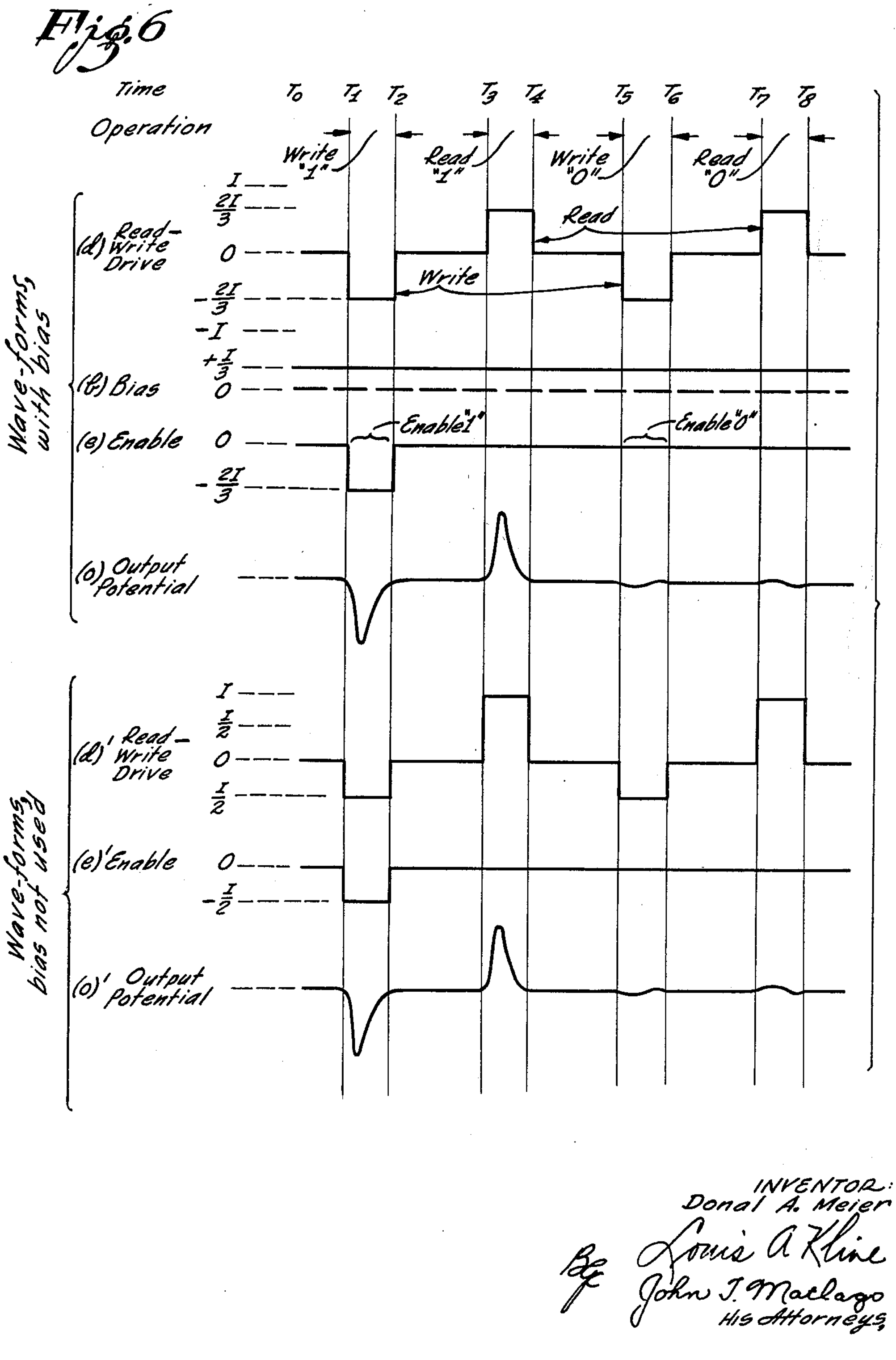
FIG. 6 is a set of typical operational waveforms illustrating operational modes using apparatus according to the invention.

The output waveform of a sense winding of an array, corresponding to each of the previously described writing and read-out operations, is represented in waveform (*o*) of FIG. 6, wherein it is noted that a potential is induced in a sense solenoid whenever the magnetic element encircled by that solenoid is reversed in state in either direction. However, as indicated, the polarities differ between writing and read-out operations, permitting easy selection of only the read-out potential pulses. Also as indicated, only very minor "noise" potentials are induced in a sense solenoid incident to writing or read-out of a binary zero in the corresponding element.

In the second mode of data-storage element selection and write-reading operations, the bias current is not employed and hence the bias windings including solenoids 21*b* may be omitted. This mode of operation involves employment of "write" drive pulses of $-I/2$ effect and "read" drive pulses of $+I$, as indicated in waveform (*d'*) of FIG. 6. Selection for writing is, again, by pulsing by a current $-I/2$ all the enable solenoids 21*e* of the array comprising the desired element, and contemporaneous driving of the solenoids 10 of the proper device 14 with a "write" drive pulse of effect $-I/2$. The reading operation is performed by only the drive pulse, of effect 1I, through the proper device 14. In this mode, the relative timing of the operations is the same as in the previously described mode, and the output waveform on a sense line is also similar, all as indicated in FIG. 6.

In the preceding description of the invention as represented by an exemplary magnetic device of exemplary construction and of exemplary composition, and incorporated into exemplary composite means, the term solenoid has been used in conjunction with exemplary relatively long helical coil means, but it is to be noted that the inductive coil means may in instances be of other than helical form and accordingly the term solenoid is to be construed in accord with its broader definition as meaning a coil formed of an electrical conductor means and serving for creation of a magnetic field in response to flow therethrough of an electric current or for generation of a potential thereacross incident to change of a magnetic field in which the coil reposes.

Further, in view of the paramount advantages of the invention flowing from the magnetic device being a unitary structure having the characteristics of an integral single piece of apparatus, the term unitary is used in the sense denoting such a single firmly united and integral structure.

In the preceding description a specific exemplary physical form of bistable magnetic element and appurtenant means has been defined, and specific forms of devices and modes of operation utilizing the described element and means have been disclosed, and it is evident that with the present disclosure in view various modifications will occur to those skilled in the art. Accordingly it is not desired to be limited to the specific exemplary structures and modes described but to include those modifications falling within the scope of the invention as defined in the appended claims.

What is claimed is:

1. A bistable magnetic data-storage device, comprising: a set of solenoids substantially coaxially and concentrically disposed relative to each other; embedding means integrating said set of solenoids into a unitary structure presenting a bore through the interior of the set of solenoids; and a bistable magnetic device readily insertable into and removable from said bore and comprising a rod-like support means and a thin film of bistable magnetic material on said support means and comprising also serially-connected solenoid means supported by said support means and encircling both the support means and the thin film of bistable magnetic material thereon, whereby said set of solenoids is arranged to receive and inductively cooperate with the solenoid and thin film on said support means for binary-data-storage and reading operations.

2. Bistable magnetic storage means comprising: a base member having a bore therein, at least one multiturn solenoid also having a bore, said solenoid being affixed with respect to said base member so that said bores are aligned, and a bistable magnetic device readily insertable and removable from said bores and comprising a rod-like support means and a thin film of bistable magnetic material thereon, said thin film having substantially square hysteresis loop switching characteristics, the length of said support means being greater than the length of said solenoid and said solenoid being arranged to receive said bistable device and inductively cooperate with the thin film on said support means for binary-data-storage operations.

3. Bistable magnetic storage means comprising: a plurality of spaced solenoids rigidly affixed in a common plane, each solenoid having a bore therein, and a bistable magnetic device readily insertable and removable from each bore, each bistable magnetic device comprising a rod-like support means and a thin film of bistable magnetic material thereon, said thin film having a thickness of 500 to 5,000 angstroms, the length of each support means being greater than the length of its respective solenoid and each solenoid being arranged to receive a respective bistable device and to inductively cooperate with the thin film thereon for binary-data-storage operations.

4. Bistable magnetic storage means comprising: a plurality of spaced multi-turn solenoids rigidly affixed in a common plane, each solenoid having a bore therein, and a bistable magnetic device readily insertable and removable from each bore, said bistable magnetic device comprising a rod-like support means and a thin film of bistable magnetic material thereon, said thin film having substantially square hysteresis loop switching characteristics, the length of each support means being greater than the length of its respective solenoid and each solenoid being arranged to receive a respective bistable device and to inductively cooperate with the thin film thereon, and means for electrically connecting said solenoids in a predetermined manner.

5. Bistable magnetic storage means comprising: a base member having a bore therein, at least one multi-turn solenoid also having a bore, said solenoid being affixed with respect to said base member so that said bores are aligned, and a bistable magnetic device readily insertable and removable from said bores and comprising a rod like support means having a thin film of bistable magnetic material thereon and a solenoid wound on and supported by said bistable magnetic device, said thin film having substantially square hysteresis loop switching characteristics, said bistable device being inserted into said bores so that said solenoids are closely coupled thereto for cooperation with the thin film on said support means in the performance of binary-data-storage operations.

6. Bistable magnetic storage means comprising: a plurality of spaced solenoids affixed essentially in a common plane, each solenoid having a bore therein, and a bistable magnetic device readily insertable and removable from each bore said bistable magnetic device comprising a rod-like support means having a thin film of bistable magnetic material thereon and a solenoid wound on and supported by said bistable device, each bistable device being inserted into its respective bore to permit inductive cooperation between the thin film and solenoid thereon and the respective solenoid in said common plane, and means for electrically connecting said solenoids for coincident current switching of selected bistable devices.

7. The invention in accordance with claim 2 wherein said thin film has a thicknes of 500 to 5,000 angstroms.

8. The invention in accordance with claim 7 wherein said thin film is essentially composed of an iron-nickel proportion of the order of 97 parts iron to 3 parts nickel by weight.

9. Bistable storage means comprising: a plurality of base members each having at least one bore therein, means disposing said base members with their respective bores aligned, a multi-turn solenoid associated with each base member and affixed with respect thereto so that each solenoid is aligned with the bore of its respective base member, whereby all of said solenoids are aligned, and a bistable magnetic device readily insertable and removable from said bores and comprising a rod-like support means having a thin film of bistable magnetic material thereon, said thin film having substantially square hysteresis loop switching characteristics, the length of said bistable device being at least equal to the length of the aligned solenoids associated with said base members, each of the solenoids associated with said base members being arranged to inductively cooperate with a respective portion of the thin film on the bistable device inserted therethrough.

10. Bistable storage means comprising: a plurality of base members each having at least one bore therein, means disposing said base members with their respective bores aligned, a solenoid associated with each base member and affixed with respect thereto so that each solenoid is aligned with the bore of its respective base member, whereby all of said solenoids are aligned, and a bistable magnetic device readily insertable and removable from said bores and comprising a rod-like support means having a thin film of bistable magnetic material thereon and a plurality of series-connected solenoids wound on and supported by said bistable device, the length of said bistable device being at least equal to the length of the aligned solenoids associated with said base members, each of the solenoids associated with said base members being arranged to receive a respective bistable device and to inductively cooperate with a respective solenoid wound thereon.

11. A three-dimensional magnetic data-storage matrix comprising: a plurality of juxtaposed similar two-dimensional arrays, each array comprising a plurality of spaced multi-turn solenoids having bores therein and being rigidly affixed in essentially a common plane with the bores in similarly positioned solenoids in respective arrays aligned, and a bistable magnetic device readily insertable and removable from each of the aligned bores of said solenoids, each bistable magnetic device comprising a rod-like support means having a thin film of bistable magnetic material thereon, the length of each bistable magnetic device being at least equal to the length of its respective aligned solenoids, each solenoid being arranged to inductively cooperate with a respective portion of the thin film on the respective bistable device inserted therethrough.

12. A three-dimensional magnetic data-storage matrix comprising: a plurality of juxtaposed similar two-dimensional arrays, each array comprising a plurality of spaced solenoids having bores therein and being rigidly affixed in essentially a common plane with the bores in similarly positioned solenoids in respective arrays aligned, and a bistable magnetic device readily insertable and removable from each of the aligned bores of said solenoids, each bistable magnetic device comprising a rod-like support means having a thin film of bistable magnetic material thereon and a plurality of series-connected solenoids wound on and supported by said bistable magnetic device, the length of each bistable magnetic device being at least equal to the length of its respective aligned solenoids, each solenoid being arranged to receive a respective bistable device and to inductively cooperate with a respective solenoid wound thereon.

References Cited in the file of this patent

UNITED STATES PATENTS

| | | |
|---|---|---|
| 2,736,880 | Forrester | Feb. 28, 1956 |
| 2,792,563 | Rajchman | May 14, 1957 |
| 2,910,675 | Gessner | Oct. 27, 1959 |
| 2,914,754 | Ganzhorn et al. | Nov. 24, 1959 |
| 2,942,239 | Eckert et al. | June 21, 1960 |
| 2,945,217 | Fisher | July 12, 1960 |
| 2,998,840 | Davis | Sept. 5, 1961 |
| 3,051,930 | Austin | Aug. 28, 1962 |
| 3,069,661 | Gianola | Dec. 18, 1962 |
| 3,083,353 | Bobeck | Mar. 26, 1963 |

OTHER REFERENCES

Publication I, "Magnetization Reversal and Thin Films," by D. O. Smith, Journal of Applied Physics, vol. 29, No. 3, March 1958, pages 264–273.

UNITED STATES PATENT OFFICE

CERTIFICATE OF CORRECTION

Patent No. 3,134,965 May 26, 1964

Donal A. Meier

It is hereby certified that error appears in the above numbered patent requiring correction and that the said Letters Patent should read as corrected below.

Column 3, line 28, for "expansive" read -- expensive --; line 65, for "distored" read -- distorted --; column 7, lines 11 and 12, for "concenring" read -- concerning --; line 52, for "has" read -- as --; column 8, line 3, for "eigtht" read -- eight --; line 48, for "interconnetcing" read -- interconnecting --; same column 8, line 65, for "embodiments" read -- embedments --.

Signed and sealed this 29th day of September 1964.

(SEAL)
Attest:

ERNEST W. SWIDER
Attesting Officer

EDWARD J. BRENNER
Commissioner of Patents